United States Patent [19]
Phillips

[11] 3,792,746
[45] Feb. 19, 1974

[54] SELECTIVE REAR WHEEL EMERGENCY BRAKE ACTUATOR

[76] Inventor: Stanley C. Phillips, P.O. Box 424, Shelton, Wash. 98584

[22] Filed: Nov. 6, 1972

[21] Appl. No.: 303,820

[52] U.S. Cl............................... 180/82, 188/16
[51] Int. Cl........................... B60k 27/00, B60t 1/00
[58] Field of Search ............... 180/82; 188/16, 116

[56] References Cited
UNITED STATES PATENTS

| | | | |
|---|---|---|---|
| 3,398,813 | 8/1968 | Pontani | 188/16 |
| 2,051,990 | 8/1936 | Endres | 188/16 |
| 1,736,082 | 11/1929 | Houseman | 188/16 |
| 1,389,717 | 9/1921 | Von Babo | 188/16 |
| 1,593,949 | 7/1926 | Piche | 188/16 |

Primary Examiner—Allen N. Knowles
Attorney, Agent, or Firm—Harvey B. Jacobson; Clarence A. O'Brien

[57] ABSTRACT

An extricating device for use when a motorist gets stuck in sand, mud or snow and desires to extricate himself without assistance from other motorists or a costly tow truck. This device is usable in conjunction with customary emergency brake cables which serve to simultaneously apply and release the power driven rear wheel brakes. A T-shaped actuator is pivotally mounted on a floor-supported adapter having a vertical journal. Auxiliary left and right cables are connected at forward ends to an actuator and have rearward ends joined by cable clamps, to the respectively cooperable reach portions of the main cables. A selectively switchable projectable and retractable lever is operatively mounted atop the actuator. By switching the handle of the lever to the right rotation of the left wheel can be stopped, and, conversely, switching it to the left rotation of the right wheel can be stopped. This principle of selectively stopping one wheel and permitting the other one to turn usually provides the traction needed to extricate the vehicle.

10 Claims, 4 Drawing Figures

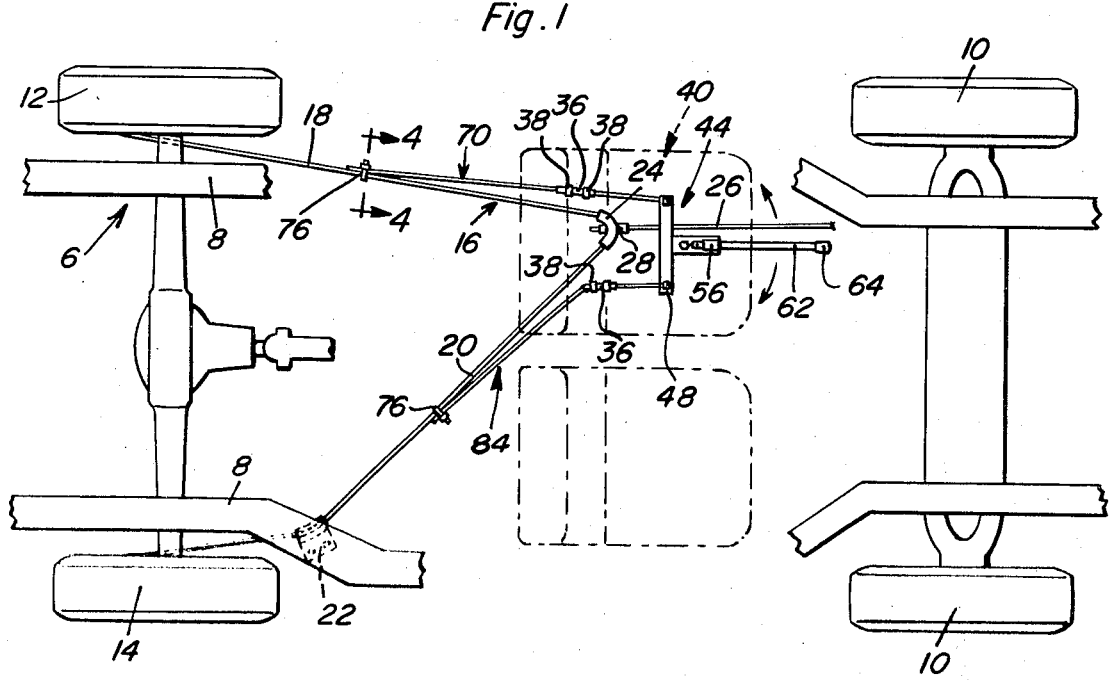
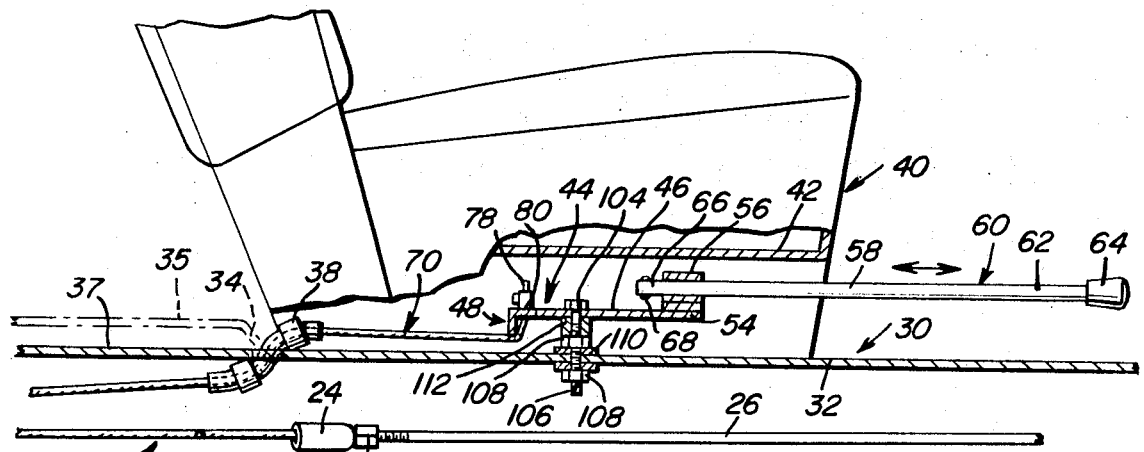
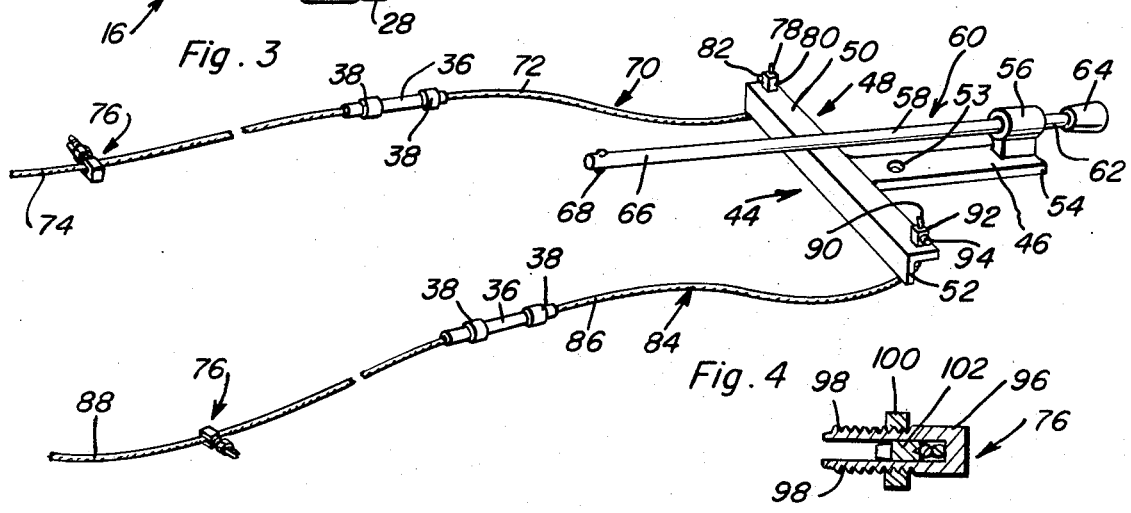

SELECTIVE REAR WHEEL EMERGENCY BRAKE ACTUATOR

This invention relates to an improved built-in-type wheel extricating device, that is, a manually controllable device which can be readily and effectually installed in an out-of-the-way position under the front seating means and which is such in construction that it enables a motorist to selectively start and stop the rear driven wheels, that is, in a manner to provide the necessary traction to extricate the vehicle from slippery mud, deep sand or snow, as the case may be.

Many and varied vehicle wheel extricating devices and trial and error procedures have been offered with a view toward coping with the problem of extricating a motor vehicle from mud, sand and snow. Despite the efforts of others working in this field of endeavor prior art practices have, or so it would seem, not met with widespread adoption and use. An object of the present invention is to provide extricating means which lends itself to on-the-spot use when a motorist gets bogged down in sand, mud or snow and which when there is no assistance at hand, well serves its intended purpose. To the ends desired the device is usable in conjunction with customary emergency brake cables and functions to use the rear driven wheels singly and selectively in a manner to initiate traction which, under ordinary circumstances, enables the motorist to get underway safely and with expected reliability.

For background purposes, reference, if desired, may be made to U.S. Pat. No. 1,593,949 granted to Frank W. Piche and which pertains to brake mechanism capable of being operated selectively for braking one of a pair of vehicle traction members and also to U.S. Pat. No. 1,736,082 granted to Harold E. Houseman and pertaining to a brake for motor driven vehicles. These prior patents pertain primarily to emergency brake means characterized by rigid elongated properly paired rods. The present invention is more universal in character and extent and can be successfully applied to virtually any make or model, new or old, that has rear emergency brake cables and whether the cables are operated by a front lever or foot pedal, as the case may be. Then, too, the present concept pertains to an adaptation which is such in construction and capability that no alteration of the currently used emergency brake cables is necessary.

With a view toward advancing the art and promoting simplicity and efficiency in purpose and operation, significant components of the overall structure, that is, the pivoted actuator, control lever and anchored adapted means are capable of being installed in a virtually concealed position under the front seat, usually the driver's seat, the lever being in a retracted out-of-the-way but readily available locale.

Briefly the concept pertains to manually applicable driver-controlled means for applying and releasing the left and right reach portions of the regular or customary emergency brake cable means. In carrying out a preferred embodiment a post-like adapter is provided, more specifically an adapter characterized by a nut and washer anchored headed bolt means. The upper shank portion of the bolt is surrounded by a spacing sleeve and that portion between the sleeve and the head provides a journal. It is on the journal that the apertured arm of the T-shaped actuator is journaled, that is, in a manner that the actuator is capable of oscillating from left to right in a horizontal plane on a vertical axis. A forward end of the actuator arm is provided with a guide which in turn is provided with a projectable and retractable rod which constitutes an appropriate control lever. Auxiliary cables are connected to the actuator, have their median portions operating through plastic guides mounted in the floor, the free rear ends of the auxiliary cables having clamps which are clampingly connected to the respectively cooperable reach portions of the yoke-like emergency brake cables.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view showing a fragmentary portion of the wheel supported motor vehicle chassis, the front and rear wheels, the main brake cable means connected with the left and right rear wheels and, what is more significant, the auxiliary cables of the selective rear wheel emergency brake actuator means and also showing, in phantom lines, front seats with which the lever controlled actuator is cooperable.

FIG. 2 is a view on an enlarged scale with parts in section and elevation and showing with greater particularity the construction and arrangement of the significant parts.

FIG. 3 is a view in perspective showing the selective rear wheel emergency brake actuating device.

FIG. 4 is an enlarged detail section taken approximately on the plane of the line 4—4 of FIG. 1 looking in the direction of the indicating arrows.

With reference first to FIG. 1 the frame structure of the wheel supported chassis is denoted, generally stated, by the numeral 6 and is characterized, as usual, by coplanar spaced generally parallel side frame members 8. The steerable front wheels are denoted at 10 and the power driven rear wheels are denoted at 12 and 14. These rear wheels are differentiated merely to set forth that the rear wheel 12 constitutes the left wheel and the other wheel 14 the right wheel. The customary V-shaped or yoke type emergency brake cable means is denoted at 16. The left hand reach portion 18 of the cable means has its rearward end connected in any suitable manner (not shown) with the emergency brake means in the wheel 12. The other right hand reach portion 20 is partly supported by a suspension bracket 22 and is likewise operatively connected in any suitable manner (not shown) with the right hand wheel 14. The bight portion is equipped with the usual sleeve or equivalent connector 24. A rearward end of the emergency brake rod 26 is adjustably and appropriately connected as at 28 with the connector 24. The floor of the vehicle is denoted in FIG. 2 by the numeral 30 and the area primarily under consideration is denoted at 32. In certain makes of cars a bend (phantom lines) is provided in the floor, as at 34, thus differentiating the elevated floor portion 35 from the complemental portion 32. Holes can, if desired, be bored through this bent portion 34 (FIG. 2). These holes serve to accommodate appropriate plastic or equivalent wear resisting sleeves 36 maintained in place by friction-held assembling and retaining collars 38. Where no bend exists and the floor is flat (as shown in full lines at 37) the holes for the sleeves 36 can be suitably drilled straight up through the floor (not detailed). The seating means, generally stated, is denoted by the numeral 40 and the portion which is here designated as the underneath side of the associated seat is denoted at 42.

The aforementioned selective rear wheel emergency brake actuator or device is shown with particularity in FIG. 3 where it will be observed that the aforementioned actuator is denoted by the numeral 44. This actuator is preferably of T-shaped construction in plan, the flat-faced leg portion being denoted at 46 and the crosshead is denoted at 48. The crosshead is made from a length of angle iron the top flange being denoted at 50 and the depending vertical flange at 52. An intermediate portion of the aforementioned leg is provided with a bearing hole 53. In addition, the forward end 54 is provided with an integral upstanding horizontal guide 56. This guide serves to support the rod portion 58 of a projectable and retractable lever 60. This is to say, the lever comprises an elongated rod which is shiftably but retentively mounted in the guide 56 and has a forward end 62 terminating in an attachable and detachable rubber handgrip 64, the opposite rearward end 66 having a stop 68 to limit the forward sliding movement of the lever when it is in the position shown for example in FIGS. 1 and 2.

One auxiliary cable, the one designated as the left cable is denoted by the numeral 70. A median portion 72 of the cable is threaded and slidable through the anti-friction and wear resisting sleeve 36. The rearward end portion 74 is provided with a cable clamp 76. The forward end portion 78 extends upwardly through opening means provided therefor and is held in place by an appropriate collar 80 which in turn is secured by a setscrew 82. The companion right hand auxiliary cable is of the same construction and is conveniently differentiated by the numeral 84. Here the intermediate portion 86 extends through a similar sleeve 36, the rearward end portion 88 being provided with a cable clamp 76 which corresponds to the cable clamp 76 already mentioned. The forward end 90 is provided with an assembling and retaining collar 92 held in place by a setscrew 94.

With respect to the aforementioned cable clamp 76 this is of common construction and as shown in FIG. 4 comprises a head 96 with threaded legs 98 on which a nut 100 is operatively mounted. This nut serves to apply and release a follower 102 located between the legs and which is associated with the head 96 in a manner to permit the cables to be overlapped and bound and clamped together in the manner illustrated.

With respect now to the adapter (FIG. 2) this comprises a bolt whose upper end is headed and denoted at 104. The threaded shank of the bolt 106 extends down through an opening provided therefor in the floor and is provided with assembling and retaining nuts 108 and complemental washers 110. The non-threaded portion of the shank of the bolt provides a satisfactory journal and is surrounded by a spacing collar 112 (FIG. 2). The headed end of the bolt and the collar serve to accommodate the apertured leg 46 thus providing the desired pivotal mounting of the overall actuator.

As is evident in FIG. 1, the respective auxiliary cables 70 and 84 are positioned adjacent to and clampingly connected with the reach portions 18 and 20 of the aforementioned brake applying cable means 16. This construction and arrangement is brought out in detail in FIG. 1.

With this construction and arrangement it will be evident that when the handle means of the lever 60 is swung to the right, the left wheel slows down or stops, depending on how hard the handle is pushed. When the handle is pushed to the left, the right wheel slows down or stops, depending on how hard the handle means is pushed.

In actual practice it is within the purview of the invention to criss-cross the auxiliary cables 70 and 84 (not detailed) under which circumstances the actuation of the main and auxiliary cables will be reversed. Experience has shown that where the auxiliary cables are crossed they do not interfere with the operation of the main cables because when pushed to the right the left cable slackens and when pushed to the left, the right cable slackens.

A consideration of the views singly and collectively will enable the reader to obtain a clear and comprehensive understanding of the invention. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a mobile wheel supported motor vehicle chassis embodying a frame structure, left and right front steerable wheels operatively supported on oriented forward portions of the usual lengthwise side members of said frame structure, left and right rear power driven wheels operatively supported on coordinating rearward portions of the respective side frame members, said rear wheels having customary self-contained primary foot pedal actuated brake means and complemental secondary emergency brake means, equalized main cable means cooperable with and functioning to control said emergency brake means, manually applicable driver-controlled means for applying and releasing said main cable means and coacting emergency brake means whenever necessary or desired, floor means, seat means supported atop said floor means, adapter means anchored on said floor means, cooperatively associated with said seat means and embodying a vertical upstanding journal, an actuator pivotally journaled atop said journal and switchable in a horizontal plane proximal to but above the level of said floor means, a lever carried by said actuator, said main cable means embodying a left hand reach portion connected to and for operating the left rear wheel emergency brake and a right hand reach portion connected to and for operating the right rear wheel emergency brake, and a pair of companion left and right auxiliary cables coplanar and oriented with said main cable means, said auxiliary cables having rearward ends clampingly connected to predetermined median portions of the left and right reach portions of said main cable means and forward end portions operatively connected with predetermined portions of said actuator.

2. Tee combination defined in and according to claim 1, and wherein said adapter means is adjustably and replaceably anchored on said floor means adjacent a component part of said seat means.

3. The combination defined in and according to claim 1, and wherein said adapter means is adjustably and replaceably anchored on said floor means adjacent a component part of said seat means, said adapter means embodying a bolt having an upper headed end and a shank, a portion of said shank adjacent said head constituting a journal.

4. The combination defined in claim 3, and wherein said shank is surrounded by a spacing collar, spaced below said head, said actuator embodying a leg provided with a bearing which is operatively mounted and journaled on said shank between said head and an adjacent end of said spacing collar.

5. The combination defined in and according to claim 4, and wherein said actuator is T-shaped in plan and embodies a leg having an integral cross-head at its rearward end and a guide affixed to its forward end, said lever comprising an elongated projectable and retractable rod, said rod being shiftably slidable in said guide and having a forward handle portion provided with a terminal handgrip.

6. The combination defined in and according to claim 5, and wherein the forward end portions of said auxiliary cables are detachably and adjustably and accessibly connected to predetermined cooperating end portions of said crosshead.

7. The combination defined in and according to claim 4, and wherein said adapter means is not only anchored adjacent but is confined along with the actuator and lever underneath the coacting component part of said seat means, whereby when the lever is not being used it is retracted and stored in an out-of-the-way position wholly beneath said seat means.

8. For installation and use on the floor of a mobile wheel supported motor vehicle provided, as customary, with power driven left and right rear wheels equipped with emergency brakes and operating cables therefor: selective rear wheel and cable actuating means comprising, adapter means designed and adapted to be securely anchored atop a predetermined seat equipped area of said floor, said adapter means embodying an upstanding journal, an oscillatable actuator pivotally journalled atop said journal and switchable from left to right and vice versa in a horizontal plane proximal to but above the plane and generally parallel to said floor, selectively usable cables auxiliary to the above mentioned emergency brake operating cables, said auxiliary cables having forward ends connected to a component part of said actuator and free rearward ends provided with cable clamps which are designed and adapted to be operatively clamped to respectively cooperable reach portions of said brake operating cables, and a manually controllable lever operatively mounted on said actuator.

9. The selective rear wheel and cable actuating means defined in and according to claim 8, and wherein said actuator is T-shaped in plan and embodies a leg having an integral crosshead at its rearward end and a guide affixed to its forward end, said lever comprising an elongated projectable and retractable rod, said rod being shiftably slidable in said guide and having a forward handle portion provided with a terminal handgrip.

10. The combination defined in and according to claim 9, and wherein the forward end portions of said auxiliary cables are detachably and adjustably and accessibly connected to predetermined cooperating end portions of said crosshead.

* * * * *